United States Patent [19]

Hartsuiker et al.

[11] Patent Number: 4,799,584

[45] Date of Patent: Jan. 24, 1989

[54] DRIVE MECHANISM FOR BUCKET ELEVATORS

[75] Inventors: Hendrik Hartsuiker, Clifton, N.J.; Dorcel W. Knapp, Fults, Ill.

[73] Assignee: Continental Grain Company, New York, N.Y.

[21] Appl. No.: 504,229

[22] Filed: Jun. 14, 1983

[51] Int. Cl.[4] .................. B65G 17/36; B65G 23/44
[52] U.S. Cl. ........................... 198/709; 198/711; 198/813; 198/861.1
[58] Field of Search ............... 198/813, 711, 709, 701, 198/307.1, 807, 703, 861

[56] References Cited

U.S. PATENT DOCUMENTS

| | | | |
|---|---|---|---|
| 74,590 | 2/1868 | Pohl | 198/648 |
| 240,227 | 4/1881 | Brown | 198/854 |
| 467,887 | 1/1892 | Constant | 198/582 |
| 608,180 | 8/1898 | Constant | 198/563 |
| 639,655 | 12/1899 | Berghoefer | 198/706 |
| 762,488 | 6/1904 | Neubauer | 198/709 |
| 1,441,137 | 1/1923 | Wall | 198/709 |
| 2,083,857 | 6/1937 | Neighbour | 198/537 |
| 2,685,957 | 8/1954 | Schlesinger | 198/701 |
| 2,778,511 | 4/1953 | Hueftle | 414/390 |
| 2,865,495 | 12/1958 | Oidtman | 198/860 |
| 2,964,164 | 12/1960 | Lakso | 198/813 X |
| 3,372,791 | 3/1968 | Kennedy | 198/307 |
| 3,549,003 | 12/1970 | Jacobson | 198/861 X |
| 4,013,166 | 3/1977 | Weady et al. | 198/835 |
| 4,053,997 | 10/1977 | Stuller et al. | 198/854 X |
| 4,354,595 | 10/1982 | Reynolds | 198/807 |

OTHER PUBLICATIONS

Elzey, Jan M., "World Grain—Today's Advanced Technological Design Fulfills Tomorrow's Needs", Sep. 1982.
Elzey, Jan M., "Economy, Competition, Safety Heighten Need for Technology, Innovative Design", *Grain Storage & Handling*, Feb. 1983, pp. 12–17.
Hägglunds Hydraulic Motor Catalog, 1981.
Sunstrand Transmission Brochure, 1974.
Sweet Manufacturing, Bulk Material Handling Catalog, Sep., 1980.

*Primary Examiner*—Robert J. Spar
*Assistant Examiner*—Jennifer L. Doyle
*Attorney, Agent, or Firm*—Eugene S. Indyk; Charles B. Smith

[57] ABSTRACT

A bucket type elevator having a head pulley and a boot pulley with a belt entrained about both pulleys is hydraulically driven. The drive mechanism comprises a hydraulic motor mounted in the boot pulley. It is connected, via flexible hydraulic lines, to an electric motor driven pump and fluid source located near ground level outside the boot housing, easily accessible for maintenance and replacement but far enough away from the elevator to avoid risks of explosion from the electrical power source. The elevator also includes a tensioning system for maintaining adequate and uniform tension across the width of the belt and for preventing slippage and miscentering of the belt on the boot pulley.

19 Claims, 7 Drawing Sheets

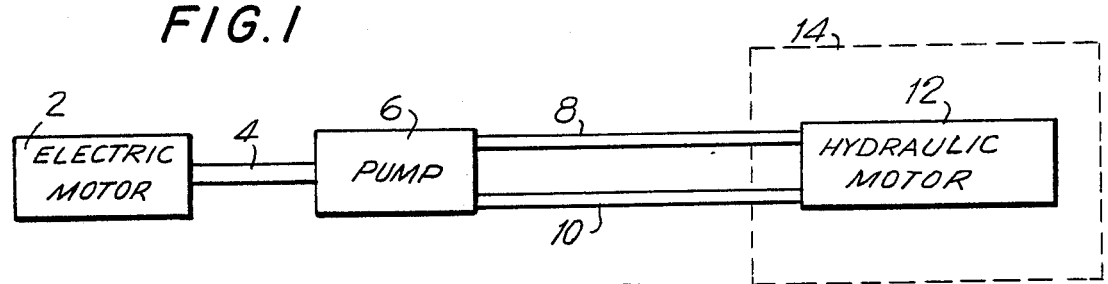
FIG.1
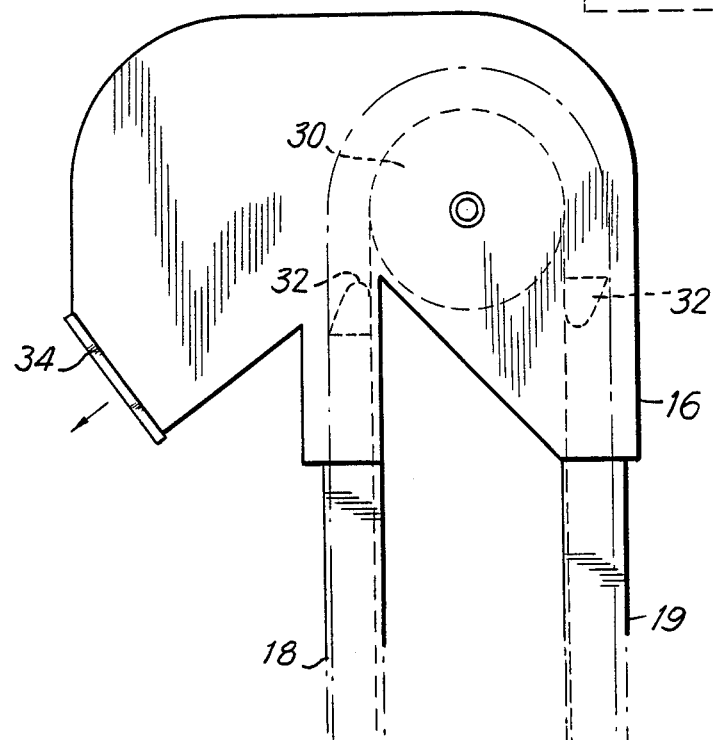
FIG.2
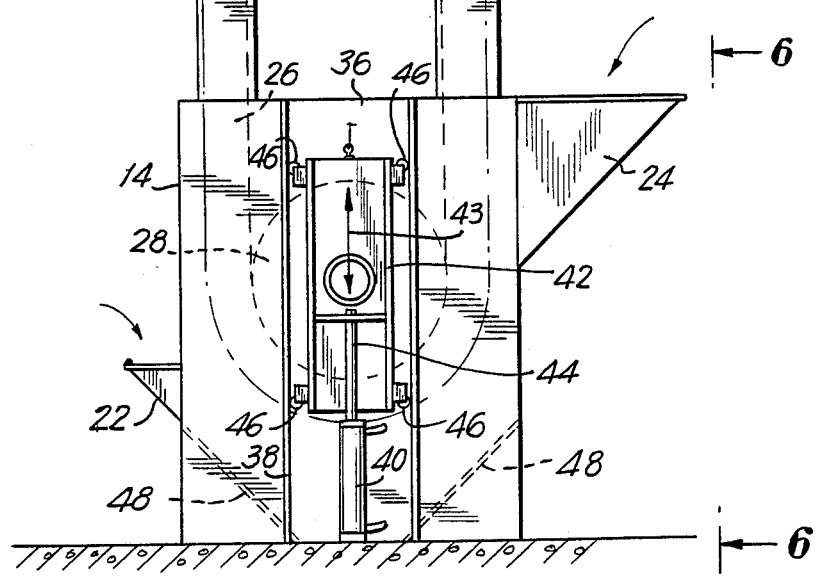

DRIVE MECHANISM FOR BUCKET ELEVATORS

BACKGROUND OF THE INVENTION

This invention relates to bucket elevators. More specifically, the invention concerns a novel drive mechanism for a bucket elevator.

Bucket elevators typically are comprised of vertical steel, aluminum or wooden housings divided into three sections: a boot section, sometimes situated below around in a boot pit, in which a boot pulled is mounted; a bucket elevator casing, extending upwardly from the boot section; and a discharge section, at the top of he elevator, in which a head pulley is mounted. A flexible belt extends through the bucket elevator casing and is entrained about the two pulleys. On the outer surface of the belt are buckets which lift granular bulk materials, for example, grain, from an inlet near the boot pulley to a discharge outlet near the head pulley, where it is deposited into a suitable storage facility or takeaway device.

The prior art bucket elevator includes a take up mechanism which slides the boot pulley vertically in the boot housing to take up any slack in the downwardly moving belt strand when the bucket elevator is started and begins to lift a load.

Prior to this invention, the belt and buckets (cups) were moved by a primary drive arrangement connected to the head pulley, located generally between 50 and 250 feet above ground level. This drive arrangement comprised an electric motor connected through a flexible or fluid coupling to a gear reduction unit. The gear reduction unit, in turn, was connected, through a flexible coupling or chain and sprocket reduction, to the head pulley shaft. To move the belt and buckets slowly for damage inspection purposes, a smaller, secondary creep drive arrangement was connected to the head pulley near the larger primary drive This invention deals with a hydraulic drive for the boot pulley of a bucket elevator, consolidating the prior primary and creep drives and take-up features into one arrangement. The invention also eliminates the heavy, complicated, hard to reach and service drive arrangement at the head end of the bucket elevator.

Driving bucket elevators at the boot pulley has never been attempted because boot pits are generally below ground and subject to moisture and material spillages. Boot pits are also crowded with equipment and not easily accessible for maintenance or replacements. Motors, switches and electrical controls at such a location could provide a possible ignition source for a dust explosion. A boot pulley drive has also never been attempted because no one has been able to establish the correct formulas or mechanical equipment to provide enough tension on the boot pulley to prevent belt slippage against the boot pulley. This slippage is to be avoided because it is also a possible ignition source for a dust explosion within the housing of the bucket elevator.

Because the head pulley was the drive pulley on prior bucket elevators, the weight of the buckets filled with granular material provided the necessary tension and friction on the head pulley to minimize slippage between the belt and the head pulley This tension was generally augmented with a counter weight or screw take up on the boot pulley. Mounting of the drive arrangement atop the bucket elevator, however, increased the construction costs of the bucket elevator and rendered the drive equipment relatively inaccessible for service and replacement Although highly unlikely, this prior art drive scheme when used in a grain elevator with unclassified electrical components, still could be a possible ignition source for explosions in the dust laden environment of a grain elevator.

Recently, a separate tensioning mechanism for bucket elevators has been introduced. The tensioning mechanism improved belt slippage problems while centering the belt on the boot pulley. This tensioning mechanism is shown in U.S. Pat. No. 4,354,595 to Reynolds. The bucket elevator electric drive arrangement disclosed in that patent was still mounted at the top of the bucket elevator and was difficult to service.

This invention overcomes the foregoing problems of difficult construction, limited access for service and the likelihood of explosions due to the drive mechanisms, by the provision of a hydraulic drive mechanism for the boot pulley of a bucket elevator. The drive mechanism comprises a hydraulic motor mounted within the boot pulley. The hydraulic motor is fluidically connected to a drive pump situated in an easily accessible area outside the boot pit, preferably at ground level away from the bucket elevator. The pump is driven by an electric motor situated close to the drive pump. Another electric motor is connected to a hydraulic drive which maintains proper tension on the belt to prevent belt slippage and to center the belt on the boot pulley.

SUMMARY OF THE INVENTION

It is an object of the present invention to provide a means to drive the boot pulley of a bucket-type elevator.

It is an additional object of the present invention to provide a hydraulic drive means for the boot pulley of a bucket elevator.

It is further object to mount the drive means near the bottom of the bucket elevator instead of the discharge point, as is conventionally done in the prior art.

It is also an object to reduce the equipment and installation cost of a bucket elevator by eliminating the structural steel tower, bracing and platform necessary to support the conventional drive at the top of a bucket elevator.

It is also an object of the invention to eliminate the electrical power and control wiring connecting the conventional drive at the top of a bucket elevator with equipment near the ground.

It is also an object of the invention to provide a drive means with infinite speed control at constant torque at any belt speed.

It is still a further object of the invention to provide an electric motor and pump set mounted away from the boot of a bucket elevator, easily accessible for maintenance and connected to a hydraulic boot pulley motor mounted within the boot pulley.

It is another object of the present invention to provide a hydraulic boot pulley drive for a bucket elevator with a means for maintaining adequate tension on the belt entrained about the boot pulley so that the belt does not slip and is centered on the boot pulley.

It is a further object of this invention to provide smooth starting, self-braking hydraulic drive for the boot pulley of a bucket elevator which lessens shock loading on the structual supports and mechanical components of the bucket elevator It is another object of the invention to provide a means to slowly rotate the belt for inspecting any damage to the buckets or the belt.

It is still a further object of the invention to provide a protective system for the hydraulic circuitry of the invention to divert fluid away from the hydraulic motor should it stall or be required to change speed too rapidly.

It is another object of the invention to provide a means for pumping cooling hydraulic fluid into the hydraulic lines in the event the hydraulic motor stalls.

It is an object of the invention to provide a hydraulic drive system for a bucket elevator which is economical to construct, easy to maintain, easily accessible, and free from ignition sources which could cause explosions.

Another object of the present invention is provision of a hydraulic motor which is not prone to leakage of hydraulic fluid which might contaminate the granular material, especially grain.

It is another object of the present invention to provide a novel hydraulic drive system for a bucket elevator which can be economically retrofitted to existing bucket elevators.

In accordance with the above objects, the invention is a novel drive mechanism for a bucket type elevator. The drive means comprises a hydraulic motor mounted within the boot pulley of the elevator. The hydraulic motor is fluidically connected to a pump driven by an electric motor. The pump and motor could be situated on the outside of the building containing the bucket elevator, in a non-hazardous area away from the bucket elevator boot, preferably near ground level.

The invention further comprises a means for tensioning the belt entrained about the boot pulley. This tensioning means not only prevents slippage between the belt and the boot pulley but also maintains uniform bearing alignment so that the belt remains centered on the boot pulley, as it lifts material to the top of the elevator.

BRIEF DESCRIPTION OF THE DRAWINGS

FIG. 1 shows a schematic representation of a boot drive for a bucket elevator, according to the present invention.

FIG. 2 is a schematic front view of a belt driven bucket type elevator embodying the boot drive of the present invention.

DETAILED DESCRIPTION OF THE INVENTION

Figure 3:
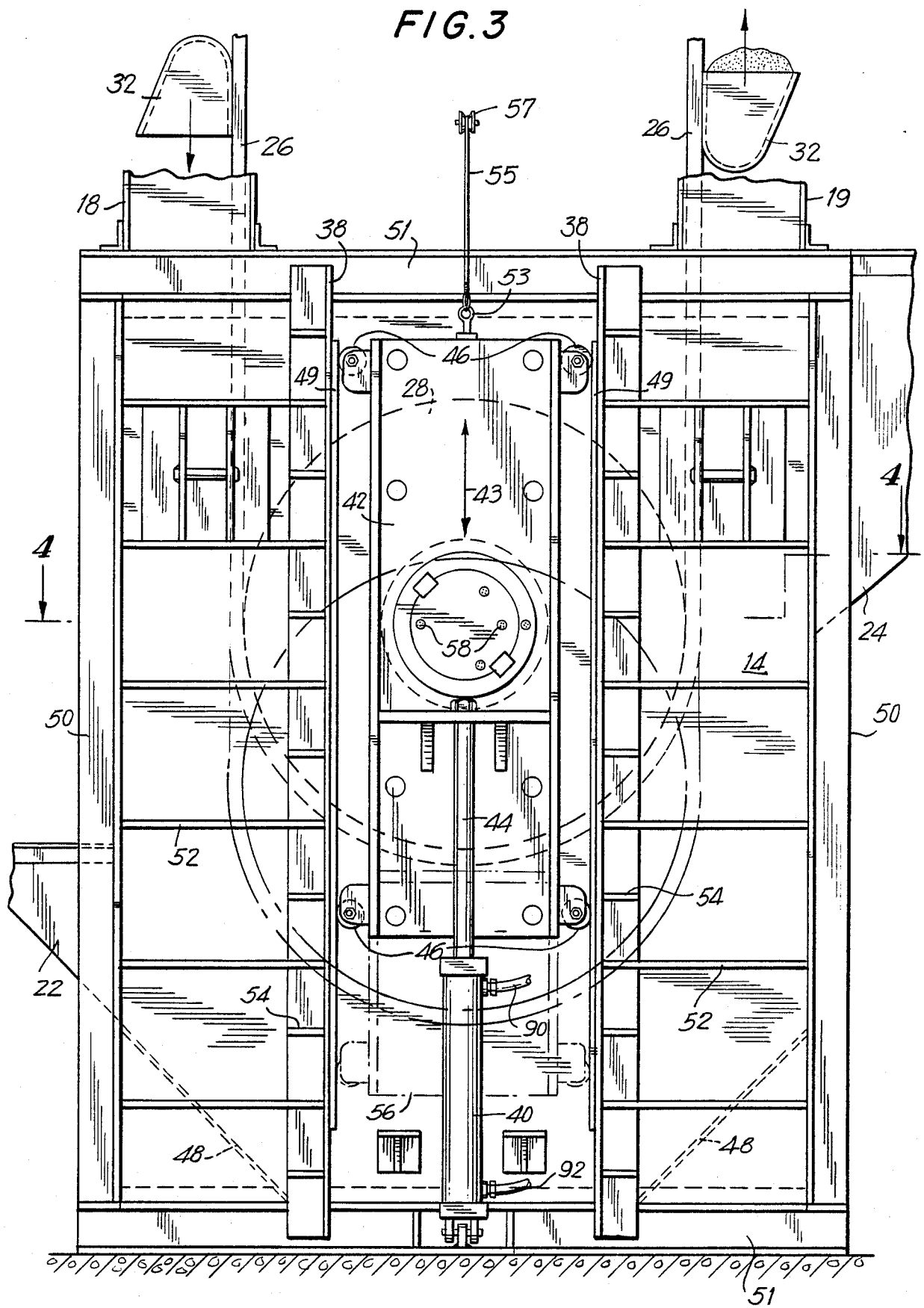
FIG. 3 is a detailed front view of the boot housing of the bucket elevator of FIG. 2.

FIG. 1 shows a simplified representation of the boot drive of the present invention. The boot drive comprises an electric motor 2 located away from the bucket elevator. The output shaft 4 of motor 2 is connected to drive a hydraulic pump 6. Pump 6 drives hydraulic fluid through inlet line 8 to a hydraulic drive motor 12 mounted in the boot housing 14 of the bucket elevator. The hydraulic fluid is returned to the pump via return line 10. As will be explained in greater detail below, the hydraulic motor is contained within the boot pulley of the bucket elevator. As is apparent to those skilled in the art, this hydraulic drive of the boot pulley is soft starting and self-braking which reduces shock loading on the structural and mechanical components of the bucket elevator. It is also capable of infinite speed control which allows a single drive to operate as both the primary drive for raising loads to the top of the bucket elevator and a creep drive for slowly rotating the belt and buckets so that they can be inspected for damage.

FIG. 2 shows a front view of a bucket elevator suitable for use with the present invention. FIG. 3 shows, in more detail, the boot housing of the FIG. 2 bucket elevator. Referring to FIGS. 2 and 3, the bucket elevator includes a discharge section 16, bucket elevator casings 18 and 19 and a boot housing 14.

Rotationally mounted within the discharge section 16 is a cylindrical discharge pulley 30. A lagged, cylindrical boot pulley 28 is rotationally mounted in the boot housing 14. Entrained about the discharge pulley 30 and the boot pulley 28 is a flexible belt 26, which can be made either of rubber or synthetic material. As will be explained below, boot pulley 28 is movable vertically along line 43 so that proper tension on belt 26 can be maintained and controlled. Attached at substantially equal intervals along the outside of belt 26 is a series of buckets 32, only two of which are shown in FIGS. 2 and 3. Boot pulley 28 is connected to the drive system of the present invention which rotates the boot pulley and the belt counterclockwise to raise material from the bottom to the top of the bucket elevator.

The drive system comprises a hydraulic motor mounted within the boot pulley. The hydraulic motor is fluidically coupled to a pump driven by an electric motor. The electric motor-pump combination is situated in a non-hazardous location away from the boot housing.

Granular bulk material is loaded into feed hopper 24 on the up-side of the elevator or into a feed hopper 22 on the down-side of the elevator and is scooped up by the buckets 32 as they advance through the boot housing. The material is conveyed upwardly from the boot housing through the bucket elevator casing 19 and into discharge section 16, where it is discharged into a suitable storage facility (not shown) at discharge point 34. The empty buckets 32 then return to the boot through bucket elevator casing 18.

FIG. 2 also shows a portion of a hydraulic take-up mechanism which tensions and centers the belt on the boot pulley. The take-up mechanism is in all respects similar to the take-up mechanism disclosed in the aforementioned Reynolds patent, the disclosure of which is hereby incorporated by reference. The hydraulic take-up mechanism comprises, in part, a hydraulic cylinder 40, fixedly attached to the base of the elevator boot housing 14, which actuates a rod 44. Rod 44 is attached to a vertically sliding torque arm 42 which is connected to the axis of the boot pulley 28. Torque arm 42 is guided vertically by wheels 46 rolling against bearing surface 49 (FIG. 3) attached to rails 38. Rails 38 are attached to the outside of the boot housing 14 and form a U-shaped channel 36 (FIG. 2) for torque arm 42. Pressurized hydraulic fluid is supplied to cylinder 40 through input lines 90 and 92 to move the boot pulley 28 vertically along line 43.

An eyelet 53 is affixed to the top of torque arm 42. This eyelet is attached to a cable 55, which is wound around pulley 57. The cable 55 is directed to the rear of the boot housing to be connected to a position sensing system to be described in connection with FIGS. 5 and 9. This position sensing system indicates any deviation of the boot pulley from the horizontal and actuates hydraulic circuitry to return the boot pulley to the horizontal.

FIG. 2 lastly shows that the boot housing 14 is provided with a pair of clean out doors 48 at each side. The doors are shown latched in an upward position, but they can be pivoted downwardly to remove debris from the boot housing when latch handles 84 (shown in FIG. 6) are released. The boot housing is also provided with a shovel hopper 22 which allows manual loading of material spilled about the bucket elevator. Shovel hopper 22 and feed hopper 24 may be interchanged or shovel hopper 22 may become a feed hopper depending on whether the bucket elevator is loaded on the downside or up-side.

FIG. 3 illustrates that the walls of boot housing 14 are reinforced by vertical angle braces 50, U-shaped horizontal braces 51 and ribs 52 extending from braces 50 to rails 38. FIG. 3 also shows that the rails 38 can be L-shaped with triangular reinforcements 54 spaced along the length of rails 38. FIG. 3 also shows, by phantom lines 56, the movement of the torque arm 42 as the tension on the belt is varied by actuation of hydraulic cylinder 40. FIG. 3 finally shows the inputs 58 to the hydraulic motor mounted within the boot pulley 28.

Figure 4:
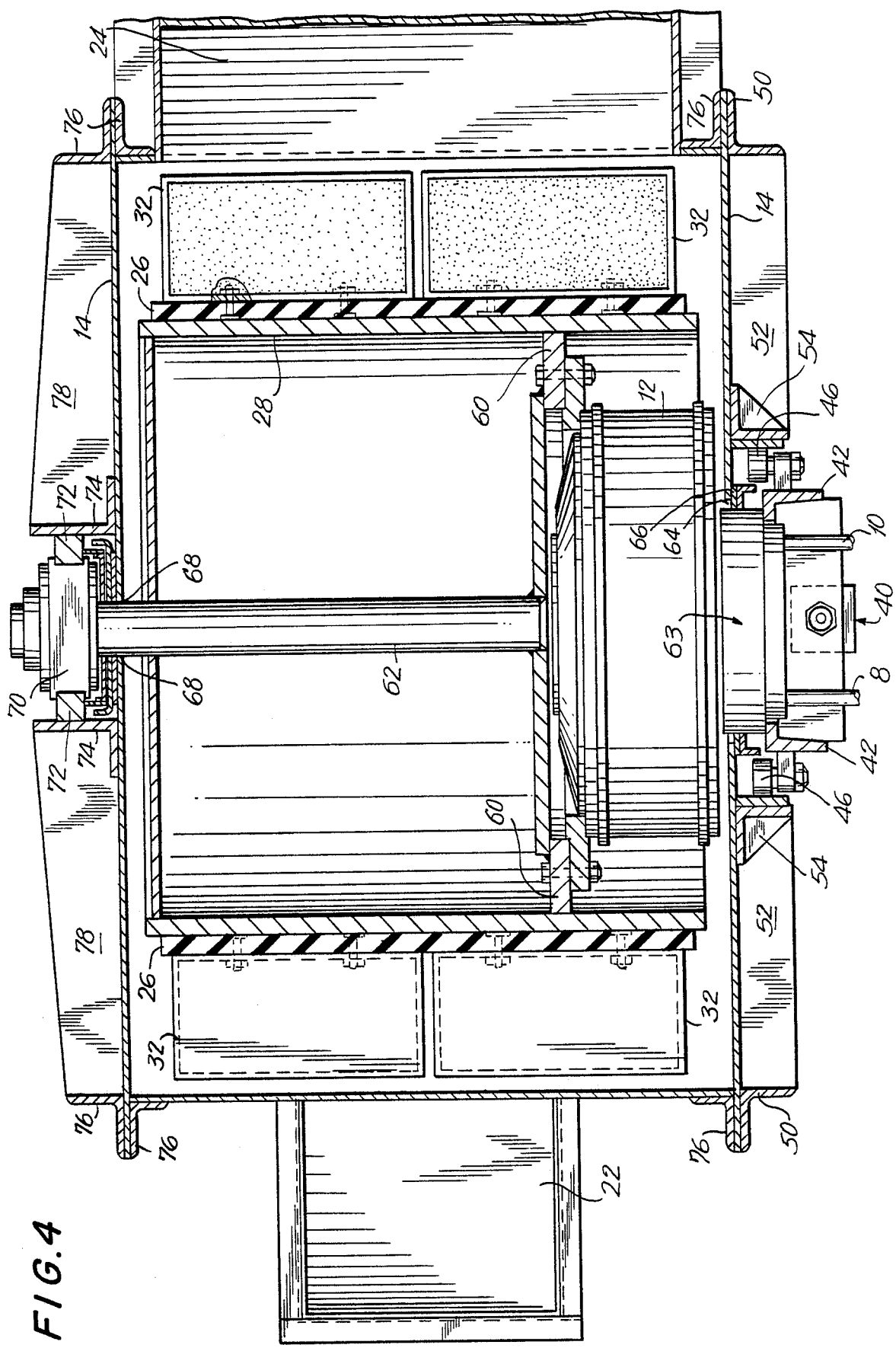
FIG. 4 is a top sectional view of the boot housing, taken along the line 4-4 of FIG. 3.

FIG. 4 is a view of the boot housing taken through line 4—4 FIG. 3. It shows the mounting of the hydraulic drive motor 12 within the boot pulley 28. This motor can be any well-known hydraulic drive motor which rotates around a stationary shaft and can provide constant torque at speeds from 1 to 70 revolutions per minute. For example, it can be a Haglunds Model 43-04700. The hydraulic motor can be fixed, in any well-known manner, to a flange 60 which is welded to the inner circumference of the boot pulley. For example, FIG. 4 shows the hydraulic motor bolted to flange 60.

Hydraulic fluid enters the hydraulic drive motor through inlet line 8 to drive the motor and boot pulley about stationary shaft 62. Hydraulic fluid exits the hydraulic motor through return line 10. Lines 8 and 10 are connected to a stationary portion 63 of the hydraulic motor which protrudes through a vertical slot 64 in the boot housing. Also connected to this stationary portion 63 is the previously described vertical torque arm 42. The slot and torque arm allow the boot pulley and hydraulic motor to be moved vertically by hydraulic cylinder 40 to vary the tension on belt 26. Torque arm 42 also transfers rotational torque reactions generated by the hydraulic motor to the boot housing. Seals 66 are attached to the stationary portion 63 of the hydraulic motor and extend the entire length of slot 64 so that the interior of the boot is sealed against contamination and spillage of material entering through feed hopper 24.

When the hydraulic drive motor is actuated, the boot pulley rotates about the stationary shaft 62. The front of shaft 62 is connected to boot pulley 28 via plate 60a welded to flange 60. The rear of shaft 62 protrudes through another vertical slot 68 and is connected to vertical bearing 70. Bearing 70 slides vertically in race 72, formed in U-shaped channel 73 (FIG. 5) by L-shaped rails 74. Bearing 70 is connected to a hydraulic takeup cylinder 80 (FIGS. 5 and 6) similar to hydraulic cylinder 40, previously described. Cylinders 40 and 80, for example, can be 4 inches in diameter and can have a 20 inch stroke. As will be disclosed more fully below, cylinder 80 in conjunction with bearing 70 and race 72 form a hydraulic take up mechanism which acts to vertically move the rear portion of the boot pulley to apply tension to the rear of the belt in an amount which tracks the tension applied by cylinder 40 on the front of the belt. This levels the boot pulley, as can be seen in FIG. 6, and centers the belt on the boot pulley. This hydraulic takeup mechanism prevents misalignment and rubbing of the belt against structural portions of the boot housing. Such rubbing of the belt on the casing could cause the casing to heat to such a degree that it could act as a possible ignition source for a dust explosion in the dust laden environment of the boot housing.

Figure 5:
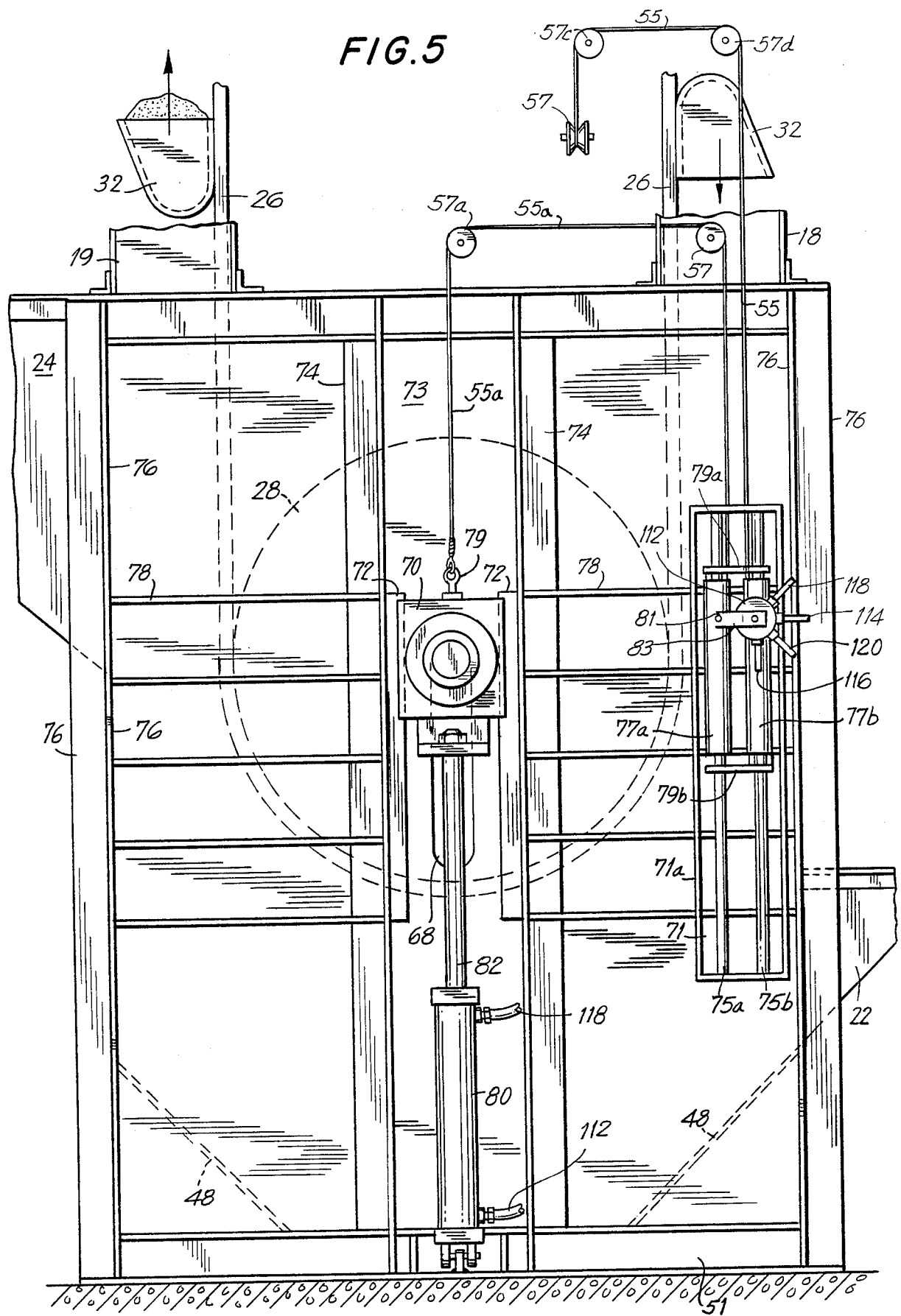
( FIG. 5 is a back view of the boot housing FIG. 3.
Figure 6:
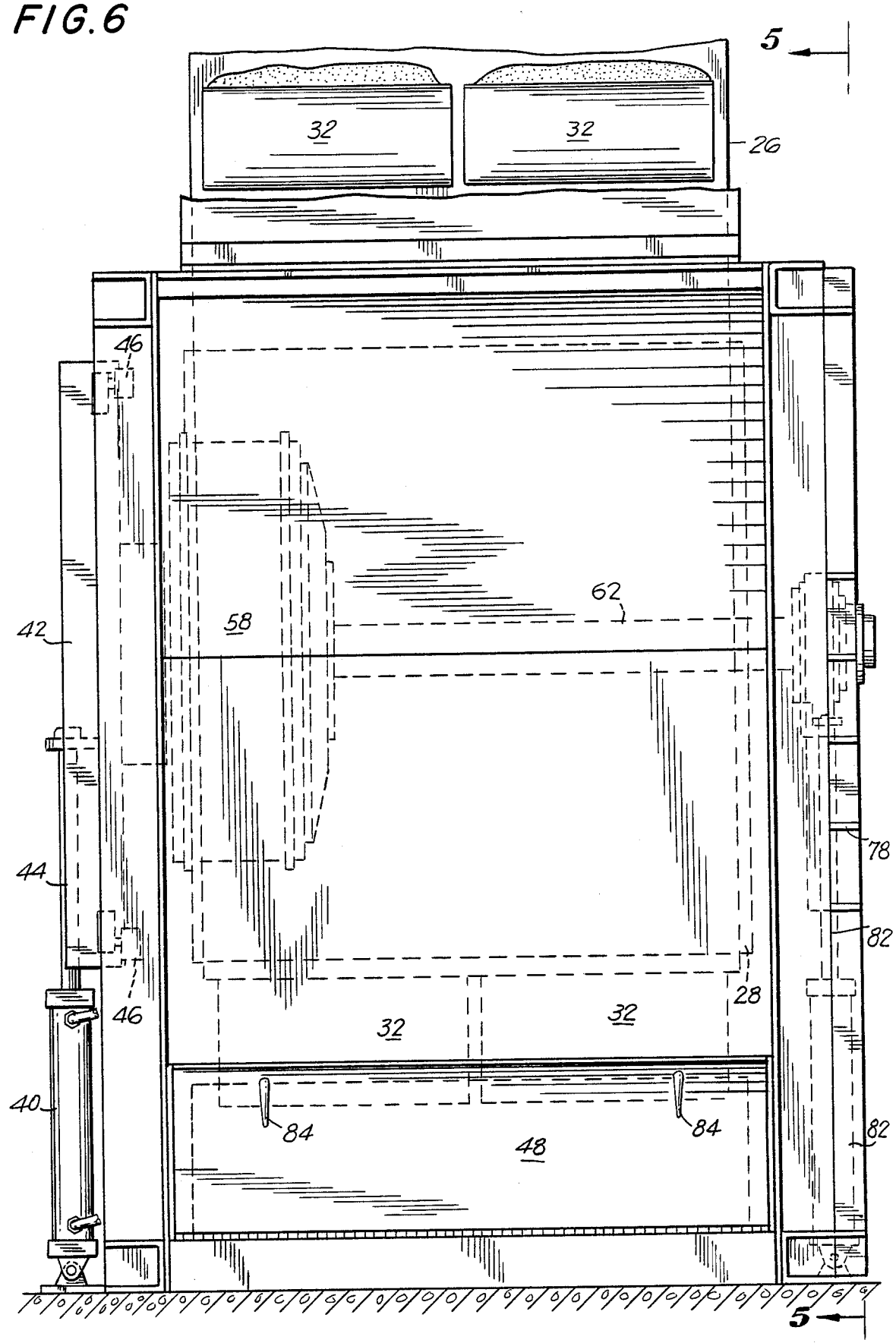
FIG. 6 is a right side view of the boot housing of FIG. 3.

Attached to the boot housing in FIG. 5 is a position sensing system 71. It comprises, in part, a pair of vertical guide bars 75a and 75b mounted inside a housing 71a. Slideably mounted along guide bar 75a is a cylindrical reference platform 77a. Collar 79a at the top of the reference platform is slideably mounted along both guide bars 75a and 75b to anchor the reference platform against tilting. A pin 81 axially protrudes from the reference platform. The reference platform is attached to cable 55a which is wound around pulleys 57a and 57b. The cable is directed downwardly where it is connected to eyelet 79 fixed to the top of bearing 70. The pin, therefore, moves vertically with bearing 70 and provides an indication of the vertical position of bearing 70 for the position sensing system.

The position sensing system also includes a follow-up platform 77b mounted along guide bar 75b. Collar 79b at the bottom of the follow up platform is slideably mounted along both guide bars 75a and 75b to anchor the the follow up platform against tilting. The follow up platform is attached to cable 55 mentioned in connection with FIG. 3. This cable is directed from pulley 57, across the top of the boot housing and wound about pulleys 57c and 57d where it is directed downwardly and attached to the follow up platform. The torque arm 42 is, therefore, connected for vertical movement with the follow up platform, which provides an indication of the vertical position of the bearing 42 for the position sensing system.

Attached to the follow up platform is a servo valve 112. This servo valve is in all respects similar to the servo valve disclosed in the aforementioned Reynolds patent. This servo valve has a fork 83 extending above and below the pin on the reference platform. If the follow up platform moves vertically with respect to the reference platform, thereby indicating that the boot pulley is no longer horizontal and that the tension across the width of the belt is uneven, then the pin 81 moves with respect to the tines of fork 83 and rotates the fork in one direction or another depending upon the relative movement between the front and rear of the boot pulley. Rotation of the fork causes rotation of an aperture within the valve so that pressurized hydraulic fluid is selectively supplied through lines 118 and 120 to cylinder 80, so that the rear of the belt is tensioned in an amount equal to the tension on the front of the belt supplied by cylinder 40. The hydraulic fluid controlled by valve 112 is supplied to valve 112 through line 114 from a pump 88, shown in FIGS. 7-9.

Figure 8:
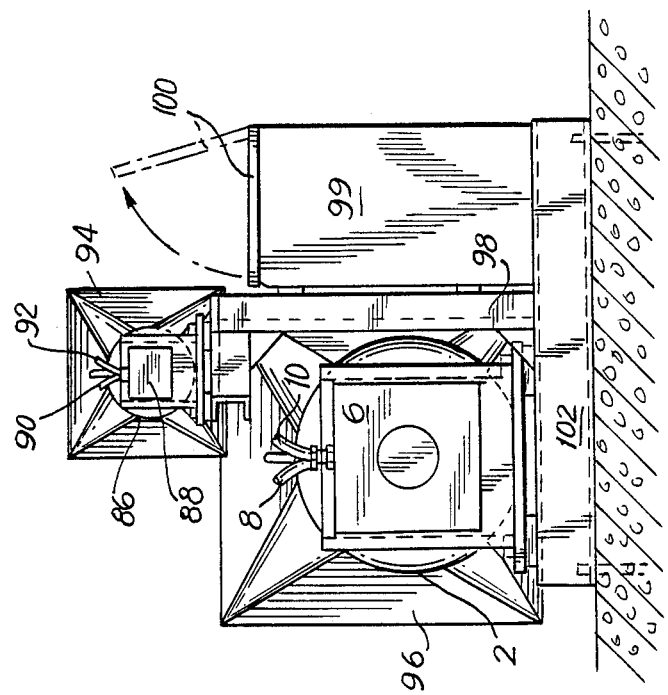
FIG. 8 is side view of the electric drive motors and hydraulic pumps shown in FIG. 7.
Figure 7:
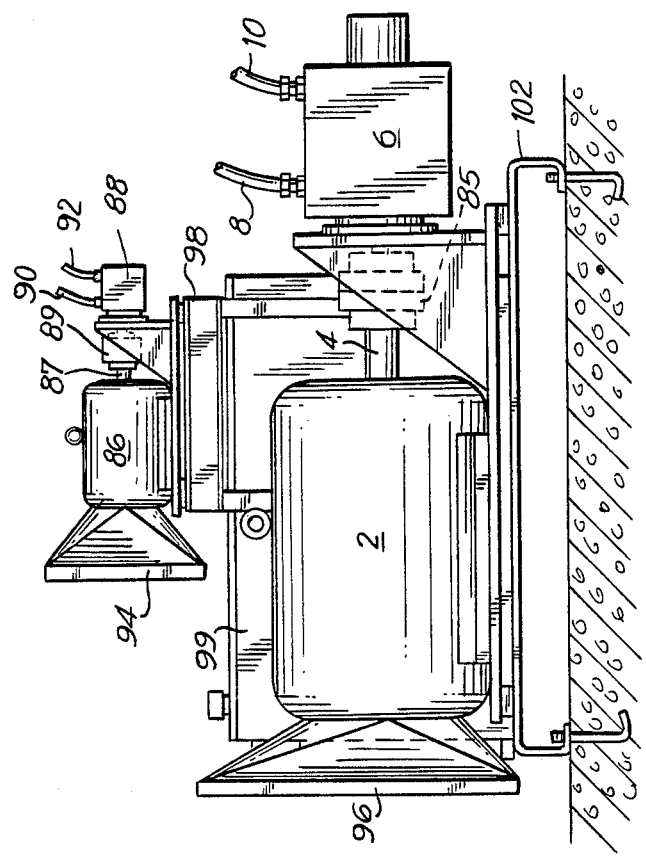
FIG. 7 is a front view of the electric drive motors and hydraulic pumps of the present invention.

FIGS. 7 and 8 depict the drive mechanisms for the hydraulic motor 12 and the hydraulic cylinders 40 and 80. These systems are mounted on a common support 102 at ground level away from the boot housing. As is readily apparent, such an arrangement minimizes any likelihood of sparking of the electric motors or electrical wiring in the dusty environment of bucket elevators, especially in grain elevators. The drive motors are also conveniently located for service in the event of a break down. Also, the bucket elevator does not have to be as ruggedly constructed as prior art bucket elevators having drive motors mounted at the discharge point, generally located 50–250 ft. in the air.

Referring to FIGS. 7 and 8, the drive system comprises an electric motor 2 having an output shaft 4. The output shaft 4 is connected to pump 6 through a flexible connector 85. Pump 6 is connected to the hydraulic motor in the boot pulley through input line 8 and return line 10, as previously described. The electric motor 2 can be any well-known electric motor preferably capable of supplying the horsepower needed for lifting the load vertically and overcoming the drive loses. Pump 6 is preferably a Sunstrand No. 26, but it can be any suitable pump which can provide fluid flow rates so that the hydraulic motor can deliver enough torque to the boot pulley to lift the desired load vertically.

Situated on support 98 is another electric motor 86. Electric motor 86 has an output shaft 87 connected to a pump 88 through a flexible connector 89. Pump 88 delivers hydraulic fluid to the hydraulic cylinders 40 and 80 through input line 90. Fluid is returned to the pump 88 via return line 92. Both electric motors 2 and 86 are connected to heat exchangers 94 and 96, respectively, to dissipate the heat of cooling oil circulating within the hydraulic systems. Pumps 6 and 88 operate from a common fluid reservoir 99 mounted on support 102.

Figure 9:
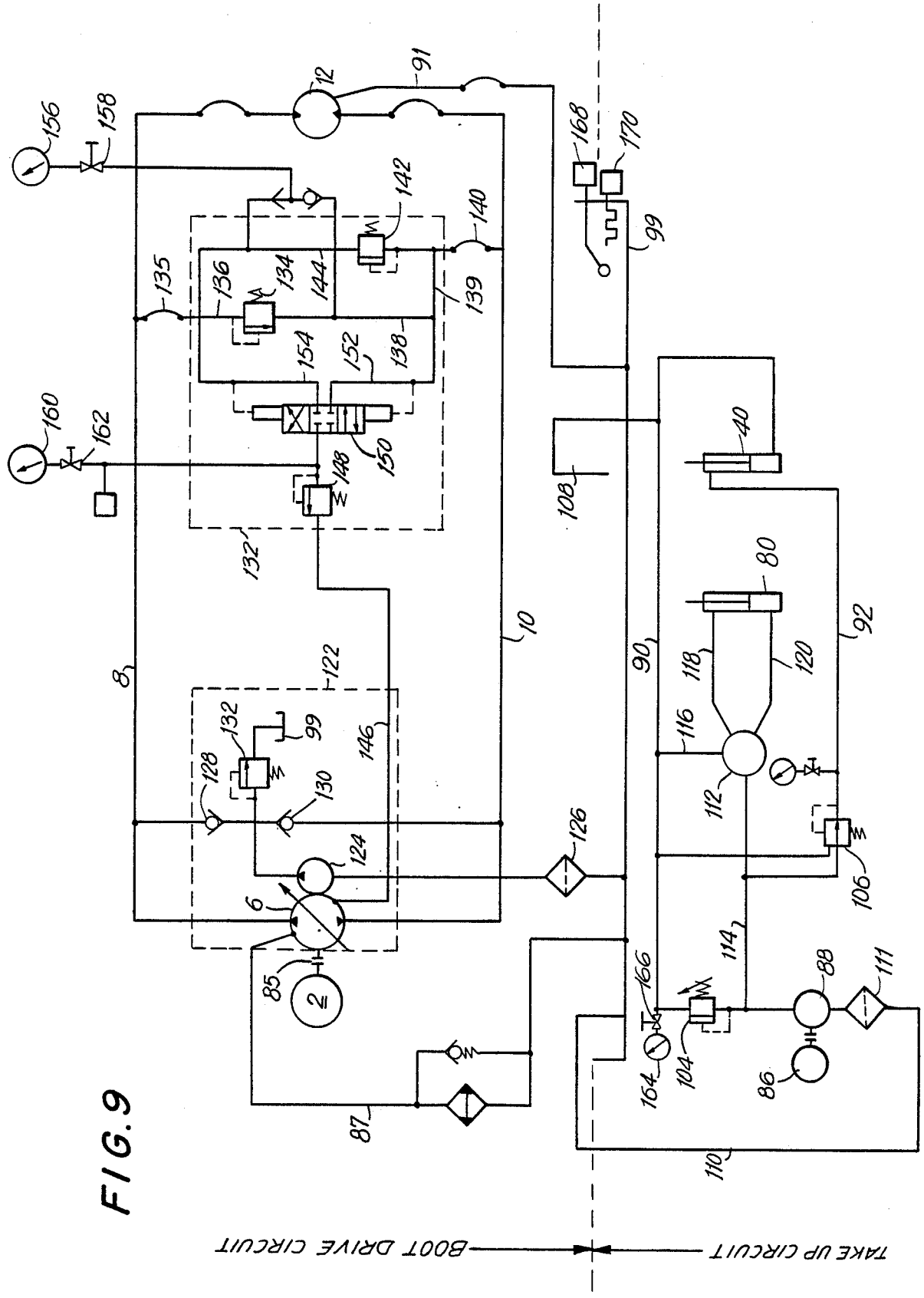
FIG. 9 is a schematic representation of the hydraulic circuitry of the present invention.

FIG. 9 shows a schematic of the hydraulic boot drive which comprises electric motor 2 connected to pump 6 through a flexible connector 85. Pump 6 delivers hydraulic fluid through inlet line 8 to hydraulic motor 12. Hydraulic fluid is returned to pump 6 through return line 10. As described previously, motor 12 is mounted within the boot pulley and drives the bucket elevator.

FIG. 9 also shows the hydraulic take up circuitry which maintains adequate uniform tension across the width of the belt and prevents belt slippage and misalignment. The take up circuitry has a reference cylinder 40 which tensions the belt to a desired amount to prevent slippage on the boot pulley. This minimizes heat which can cause a dust explosion. Reference cylinder 40 is supplied with hydraulic fluid by pump 88 through input line 90 and return line 92, as described in connection with FIGS. 7 and 8. Pressure control valves 104 and 106 set the desired pressure in hydraulic cylinder 40. This pressure pulls the boot pulley downward to provide the necessary belt tension to prevent the pulley and belt from slipping.

Pump 88 communicates with fluid reservoir 99 through lines 108 and 110. Contamination of pump 88 is prevented by strainer or screen 111 in line 110. Pump 88 also supplies hydraulic fluid to take up cylinder 80 by way of servo valve 112 and hydraulic lines 114 and 116. The servo valve 112, in conjunction with a position sensor, to be described below, provides hydraulic fluid through lines 118 and 120 to take up cylinder 80. Servo valve 112 is attached to the back of the boot housing, as shown in FIG. 5, and is connected to vertical bearing 42 by the aforementioned pulley and cable arrangement of FIGS. 3 and 5 such that it moves vertically with the vertical bearing 42. Attached to servo valve 112 is a fork 83. A pin 81 projects into the space formed by tines of the fork. This pin is connected for movement with vertical bearing 70 at the rear of the boot pulley by means of the pulley and cable arrangement of FIG. 5.

As previously described, if the front of the boot pulley moves vertically with respect to rear of the boot pulley, that is the axis of the boot pulley tilts, then pin 81 rotates the fork 83. This rotation closes a hydraulic circuit in the servo valve 112 so that the supply of hydraulic fluid admitted to cylinder 80 is changed to vertically move the rear of the boot pulley to counterbalance any movement of the boot pulley from a horizontal orientation. Cylinder 80 thereby tracks the vertical position of cylinder 40 to maintain the axis of the boot pulley in a horizontal orientation. This results in uniform tension on the belt along the axis of the boot pulley. It also minimizes any tendency of the belt to become uncentered on the boot pulley. Rubbing of the belt against structural components is lessened and, consequently, there is less likelihood of heat and explosion.

Within dotted line 122 of FIG. 9 is a circuit which compensates for any leakage of hydraulic fluid in the pump 6 or hydraulic motor 12. This leakage decreases the hydraulic fluid flow rate in the return line as compared with the input line. This compensation system comprises a charge pump 124 which receives hydraulic fluid from reservoir 99 through strainer 126. Charge pump 124 supplies the necessary fluid to return line 10 through check valve 130 to equalize the flow rates in lines 8 and 10 when the hydraulic motor is operating in the forward direction. If motor 12 is operated in reverse so that fluid flows from line 10 to line 8, charge pump 124 supplies equalizing fluid to line 8 through check valve 128. The flow rate of hydraulic fluid from pump 124 is greater than necessary to equalize lines 9 and 10 and the excess is returned to reservoir 99 through pressure control valve 132. Any leakage in the pump and hydraulic motors returned to the reservoir through lines 87 and 91, respectively.

Also shown in FIG. 9 is a crossover stall/inertia protection circuit 132. This circuit provides a complete circuit from the input line 8 to return line 10 around hydraulic motor 12 in the event the hydraulic motor stalls, for example, due to an obstruction or an abnormally large change in hydraulic motor speed. Such conditions result in a large pressure difference between lines 8 and 10 which must be relieved. A high pressure relief valve 134 opens under these high pressure conditions and allows fluid to flow directly from line 8 to line 10 through lines 135, 136, 138, 139 and 140 when the hydraulic motor is operating in forward direction when it stalls. If the hydraulic motor is operating in the reverse direction when it stalls, high pressure valve 142 opens and allows fluid to flow from line 10 to line 8 through lines 140, 144 and 135.

The crossover stall/inertia protection circuit 132 also has provision for thermal protection of lines 8 and 10 in the event of a stall. The high pressures experienced by lines 8 and 10 cause high heating of the hydraulic fluid. On the other hand, the fluid being pumped from reservoir 99 by charge pump 124 is relatively cool and can be used to cool the fluid in lines 8 and 10. If fluid is flowing from line 8 to line 10, this cool hydraulic fluid is pumped into line 10 from pump 124 and outlet 146 through a low pressure relief valve 148, a four way shuttle control valve 150 and lines 152, 139 and 140. If the fluid flow is from line 10 to line 8, then four way shuttle control valve 150 admits cooling fluid into line 8 through lines 154 and 135.

Both the compensation circuit 122 and the crossover stall/inertia protection circuit 132 are integral parts of the previously mentioned Sunstrand pump, but they can be separately constructed if the chosen pump does not have these features.

FIG. 9 also shows that pressure gauges are provided at various points in the circuit to monitor the pressure in various lines. Pressure gauge 156 is connected through two way manual valve 158 to monitor the pressure into hydraulic motor 12. Pressure gauge 160 is connected through two way manual valve 162 to monitor the pressure of cooling fluid introduced into either line 8 or line 10. Pressure gauge 164 is connected through two way manual valve 166 to monitor the pressure into reference cylinder 40, and thereby provide an indication of tension on belt 26.

Reservoir 99 is provided with a float switch 168 which is connected in any well-known circuit for indicating abnormally low levels of hydraulic fluid in the reservoir 99. Finally, reservoir 99 is provided with a heater 170 to heat the hydraulic fluid in the reservoir so that it is able to flow freely in the rest of the hydraulic circuitry. The fluid can be maintained, for example, at a temperature of 85° F. by any well-known temperature controlled heater.

As is apparent to anyone skilled in the art, this invention can be economically retrofitted to any existing belt driven bucket type elevator.

We claim:

1. A bucket elevator, for lifting a granular bulk material, having a material input point and a material discharge point above said material input point comprising,
   a cylindrical head pulley mounted for rotation near said discharge point;
   a cylindrical boot pulley mounted for rotation near said input point;
   a boot housing enclosing said boot pulley;
   a flexible belt entrained about said head pulley and said boot pulley;
   a plurality of buckets attached to said belt;
   a hydraulic drive motor mounted within said boot pulley for rotationally driving said boot pulley;
   a pump fluidically connected to said hydraulic drive motor, wherein said pump is situated near ground level away from said bucket elevator outside said boot housing; and
   an electric drive motor connected to drive said pump, wherein said electric drive motor is situated near ground level away from said bucket elevator outside said boot housing.

2. The bucket elevator of claim 1, further comprising, a tensioning means connected to said boot pulley for maintaining desired tension on said belt to avoid slippage on the boot pulley.

3. The bucket elevator of claim 2, wherein:
   said boot housing has a pair of vertical slots;
   said boot pulley is connected through said slots to a sliding bearing and torque arm so that said boot pulley slides vertically in said slots; and
   said bucket elevator further comprises seal means connected to said boot pulley for preventing contamination or spillage of said granular material through said slots.

4. The bucket elevator of claim 3, wherein said torque arm transfers rotational torque reactions generated by said hydraulic drive motor to said boot housing.

5. The bucket elevator of claim 1, wherein said granular bulk material is grain.

6. The bucket elevator of claim 2, wherein said tensioning means maintains uniform tension on the belt across the cylindrical boot pulley so that the belt remains centered on the boot pulley.

7. The bucket elevator of claim 6, wherein said tensioning means maintains said boot pulley in a horizontal orientation.

8. The bucket elevator of claim 6, wherein said tensioning means comprises
   a hydraulic reference cylinder connected to one end of said boot pulley; and
   a hydraulic take up cylinder connected to the other end of said boot pulley.

9. The bucket elevator of claim 8, further comprising a hydraulic fluid supply means connected to said reference cylinder for maintaining a desired tension on said belt.

10. The bucket elevator of claim 9, wherein said hydraulic fluid supply means is connected to said take up cylinder so that said take up cylinder tracks said reference cylinder to maintain a uniform tension across the width of the belt.

11. The bucket elevator of claim 10, wherein said hydraulic fluid supply means supplies fluid to said take up cylinder so that said belt remains centered on said boot pulley.

12. The bucket elevator of claim 1, wherein said pump and said electric drive motor are mounted on a common platform.

13. The bucket elevator of claim 1, further comprising a fluid reservoir for said pump.

14. The bucket elevator of claim 10, wherein said pump and said electric drive motor are mounted on a common platform.

15. The bucket elevator of claim 14, wherein said hydraulic fluid supply means is mounted on said platform.

16. The bucket elevator of claim 15, further comprising an electric motor for driving said hydraulic fluid supply.

17. The bucket elevator of claim 15, further comprising a common fluid reservoir for both said pump and said hydraulic fluid supply.

18. The bucket elevator of claim 12, further comprising a fluid reservoir for said pump.

19. The bucket elevator of claim 2, wherein said granular bulk material is grain.

* * * * *